(12) United States Patent
Schwarz et al.

(10) Patent No.: US 10,127,886 B2
(45) Date of Patent: Nov. 13, 2018

(54) MODIFYING HAND OCCLUSION OF HOLOGRAMS BASED ON CONTEXTUAL INFORMATION

(71) Applicant: MICROSOFT TECHNOLOGY LICENSING, LLC, Redmond, WA (US)

(72) Inventors: Julia Schwarz, Redmond, WA (US); Robert Charles Johnstone Pengelly, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 75 days.

(21) Appl. No.: 15/293,590

(22) Filed: Oct. 14, 2016

(65) Prior Publication Data
US 2018/0108325 A1   Apr. 19, 2018

(51) Int. Cl.
| G09G 5/02 | (2006.01) |
| G06F 3/01 | (2006.01) |
| G06T 11/60 | (2006.01) |
| G06T 7/20 | (2017.01) |
| G06T 19/00 | (2011.01) |

(52) U.S. Cl.
CPC ............ *G09G 5/026* (2013.01); *G06F 3/011* (2013.01); *G06F 3/017* (2013.01); *G06T 7/20* (2013.01); *G06T 11/60* (2013.01); *G06T 19/006* (2013.01); *G06T 2210/62* (2013.01); *G09G 2320/08* (2013.01); *G09G 2340/12* (2013.01); *G09G 2354/00* (2013.01)

(58) Field of Classification Search
CPC .... G09G 5/026; G09G 2340/12; G06F 3/011; G06F 3/012; G06T 19/006; H04N 2201/3245
See application file for complete search history.

(56) References Cited

U.S. PATENT DOCUMENTS

| 6,211,848 B1 | 4/2001 | Plesniak et al. |
| 8,952,990 B2 | 2/2015 | Oh et al. |
| 2013/0141419 A1 | 6/2013 | Mount et al. |
| 2013/0194259 A1 | 8/2013 | Bennett et al. |

(Continued)

OTHER PUBLICATIONS

"International Search Report and the Written Opinion cited in PCT Application No. PCT/US2017/054824 dated Nov. 23, 2017".

(Continued)

*Primary Examiner* — Antonio A Caschera
(74) *Attorney, Agent, or Firm* — Workman Nydegger

(57) ABSTRACT

A computing system, such as a head mounted display, is configured for dynamically modifying an occlusion, such as a hand occlusion, that is presented and moved within a mixed reality environment. The occlusion is associated with a movement attribute, such as a velocity or acceleration, corresponding with movement of the occlusion within the mixed reality environment. Upon detecting a movement of the occlusion, it is determined whether the movement attribute meets or exceeds a predetermined threshold. When the threshold is at least met, the visual appearance of the occlusion is modified by at least one of modifying a transparency attribute of the occlusion to cause increased transparency of the occlusion or by modifying an edge display attribute of the occlusion to cause feathering of one or more occlusion edges.

20 Claims, 7 Drawing Sheets

(56) References Cited

U.S. PATENT DOCUMENTS

2013/0321390 A1    12/2013  Latta et al.
2014/0035850 A1\*  2/2014  Shin ........................ G06F 3/041
                                                                   345/173

OTHER PUBLICATIONS

Colgan, Alex, "Bring Your Own Hands into Virtual Reality", Published on: May 27, 2015 Available at: http://blog.leapmotion.com/image-hands-bring-your-own-hands-into-virtual-reality/.

Wloka, M. M., "Interacting with virtual reality", In Publication of Springer—Virtual Prototyping, Aug. 31, 1995, 14 pages.

Ashley, Charlotte, "Camera tracks hand movements in VR", Published on: Jun. 27, 2016 Available at: http://www.inavateonthenet.net/news/article/camera-tracks-hand-movements-in-vr.

Sinha, et al., "DeepHand: Robust Hand Pose Estimation by Completing a Matrix Imputed with Deep Features", In Proceedings of the IEEE Conference on Computer Vision and Pattern Recognition, Jun. 29, 2016, 9 pages.

Kato, et al., "Virtual Object Manipulation on a Table-Top AR Environment", In Proceedings of IEEE and ACM International Symposium on Augmented Reality, Oct. 5, 2000, 9 pages.

Hauck, et al., "Occlusion of Virtual Objects for Augmented Reality Systems using Kinect", Retrieved on: Jul. 11, 2016 Available at: http://www.gcg.ufjf.br/pub/doc92.pdf.

"First 'touchable' hologram created in Japan", Published on: Jan. 4, 2016 Available at: http://www.theweek.co.uk/68187/first-touchable-hologram-created-in-japan.

Plesniak, et al., "Spatial Interaction with Haptic Holograms", In Proceedings of the IEEE International Conference on Multimedia Computing and Systems, Jun. 1999, 14 pages.

Mavasher., "Hand Occlusion", Published on: May 21, 2016 Available at: http://forums.hololens.com/discussion/815/hand-occlusion.

"Gestures", Published on: Jun. 3, 2016 Available at: https://developer.microsoft.com/en-us/windows/holographic/gestures.

"Hologram", Retrieved on: Jul. 11, 2016 Available at: https://developer.microsoft.com/en-us/windows/holographic/hologram.

Infante, Andre, "Five Questions About Microsoft's Project HoloLens", Published on: Jan. 23, 2015 Available at: http://www.makeuseof.com/tag/five-questions-microsofts-project-hololens/.

\* cited by examiner

MODIFYING HAND OCCLUSION OF HOLOGRAMS BASED ON CONTEXTUAL INFORMATION

BACKGROUND

"Mixed-reality" typically refers to augmented reality where virtual objects are visually placed within the real-world. In contrast, "virtual reality" typically refers to immersive virtual experiences where a user's view of the real-world is completely obscured and only virtual objects are perceived. However, for the sake of clarity and simplicity, the terms mixed reality, virtual reality and augmented reality are used interchangeably herein.

Mixed reality systems are typically configured as head mounted displays that generate and/or render the mixed reality content. Continued advances in hardware capabilities and rendering technologies have greatly increased the realism of virtual objects and scenes displayed to a user within mixed reality environments. For example, virtual objects can be placed within a mixed reality environment in such a way as to give the impression that the virtual object is part of the real world.

Some mixed reality systems have been configured to replicate a user's body parts within the mixed reality, such that the user is able to view and control virtualized body parts within the mixed reality environment. For instance, a user's hand can be presented as a hologram occlusion that moves within the mixed reality environment in direct response to the movements of their own real world hand. As the user moves their real world hand, the hand occlusion is also moved, such that it is capable of interacting with other virtual objects within the mixed reality environment.

As the user moves their head mounted display, thereby changing their perspective, the mixed reality environment automatically updates the displayed content so that the user is provided with the proper perspective and view of the virtual objects, including their hand occlusions, within the mixed reality environment.

Adjusting a user's perspective of a virtual object or scene can be computationally expensive and is associated with many difficulties that extend beyond simply updating the user's perspective of the virtual object. For example, depending upon lighting with the real world, the virtual object may be associated with different shading and specular effects from different perspectives. Similarly, depending upon the user's distance from the virtual object, the user's focal point and depth of focus may also change. Other difficulties are also associated with rendering mapped virtualizations of real world objects, such as hand occlusions, due to the increased requirements for processing the camera and mapping operations.

The foregoing problems can be particularly pronounced when virtual objects are moved within the mixed reality environment, and even more particularly when they are moved very quickly. For instance, a lag is sometimes experienced in the rendering of virtual objects as they are moved within the mixed reality environment, due to the computational burden associated with rendering of the virtual object at many different positions within such a short period of time. This can be particularly troublesome when the virtual object is a hand occlusion that is mapped to a user's own hand and the virtual hand movements lag behind the user's actual hand movements. In these situations, the user can become somewhat disoriented.

Accordingly, there is an ongoing need in the field of mixed reality for providing improved rendering techniques, particularly when animating hand occlusions.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems and methods for modifying virtual objects, particularly mapped visualizations, such as hand occlusions, within mixed reality environments. Some modifications are dynamically responsive to detected movements associated with the hand occlusions.

In some instances, a computing system is configured for rendering a mixed reality environment with one or more occlusion. The system dynamically modifies visual characteristics of the occlusion as it is moved within the mixed reality environment. The occlusion is associated with a movement attribute, such as a velocity, acceleration or lag metric. Upon detecting a movement of the occlusion, it is determined whether the movement attribute meets or exceeds a predetermined threshold. When the threshold is at least met, the visual appearance of the occlusion is dynamically modified by at least one of modifying a transparency attribute of the occlusion to cause increased transparency of the occlusion and/or by modifying an edge display attribute of the occlusion to cause feathering or blurring of one or more occlusion edges during the movement or by otherwise modifying a display of the occlusion. When the detected movement ends, the visual appearance of the occlusion is changed back to a previous state within the mixed reality environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments include systems and methods for modifying virtual objects, particularly mapped visualizations, such as hand occlusions, within mixed reality environments. Some modifications are dynamically responsive to detected movements associated with the hand occlusions.

In some instances, a head mounted display system is configured for rendering a mixed reality environment with one or more occlusion that maps to a user hand. The system dynamically modifies visual characteristics of the occlusion as it is moved within the mixed reality environment. The occlusion is associated with a movement attribute, such as a velocity or acceleration metric. Upon detecting a movement of the occlusion, it is determined whether the movement attribute meets or exceeds a predetermined threshold. When the threshold is at least met, the visual appearance of the occlusion is dynamically modified by at least one of modifying a transparency attribute of the occlusion to cause increased transparency of the occlusion and/or by modifying an edge display attribute of the occlusion to cause feathering or blurring of one or more occlusion edges during the movement. When the detected movement ends, the visual appearance of the occlusion is changed back to a previous state within the mixed reality environment.

Some of the other disclosed embodiments include gradually modifying the appearance of the occlusion correspondingly to different detected changes in the movement attribute(s) associated with the occlusion. In these embodiments, many different continuously scaled or granular levels of transparency and/or edge feathering are associated with many different corresponding magnitudes of velocity, acceleration and/or other movement attributes associated with the occlusion.

Some disclosed embodiments provide significant technical improvements to the field of mixed reality computer display systems, by improving the user experience. For example, disclosed embodiments can mitigate detrimental effects associated with lag in the rendering of hand occlusions by blurring the edges of the occlusions and/or by increasing the transparency of the occlusions so that the lag is less apparent to the user. In some instances, the lag can also be reduced by reducing rendering requirements.

Figure 1:
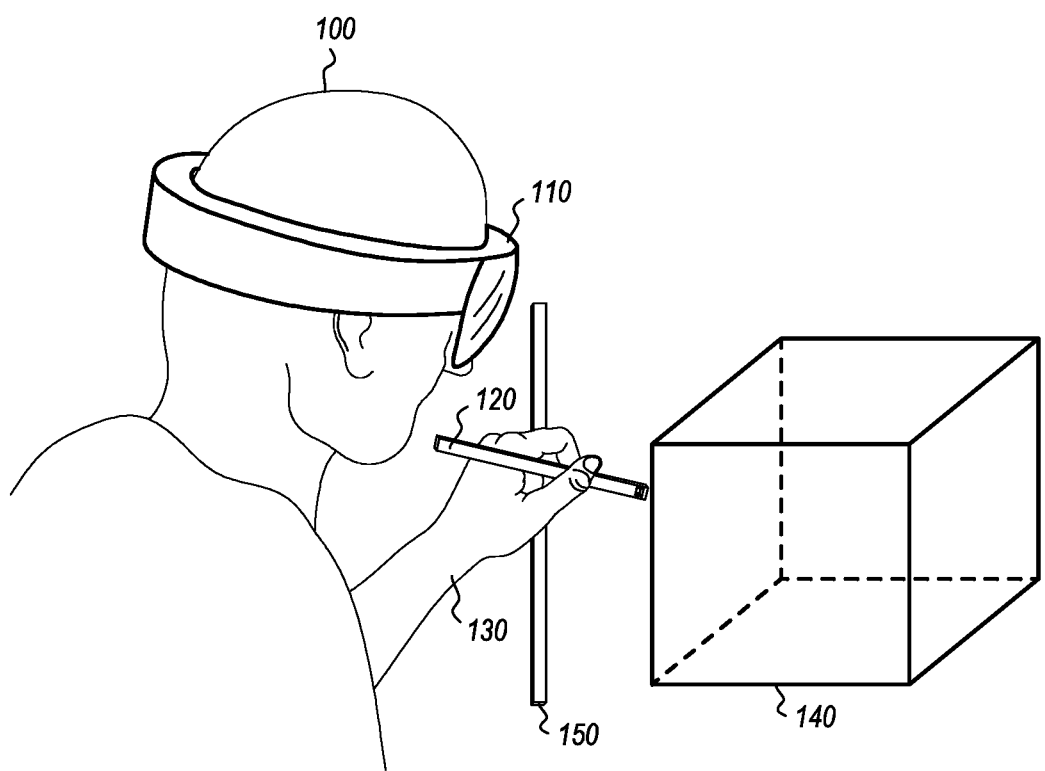
FIG. 1 illustrates a perspective view of a user wearing a head mounted display and viewing virtual objects in a mixed reality environment.

Turning now to the Figures, FIG. 1 illustrates a perspective view of a user 100 wearing a head mounted display system 110 that is operable to render a mixed reality environment to the user 100. The user 100 is able to perceive a drawing tool 120, their hand 130 and a virtual box 140 that is being creating or modified with the drawing tool 120. The drawing tool 120 and the hand 130 can be real world objects or virtual objects that are mapped to the user's real world hand. Another object 150, which can also comprise a virtual object or a real world object is also perceptible to the user through the display system 110. The user perceives object 150 as being positioned in the background, behind hand 130 and drawing tool 120, due to the actual or virtual obstruction caused by the hand 130 and drawing tool 120. For instance, when the hand 130 is virtual, it is presented with zero transparency, such that it visually occludes other objects (i.e., object 150) positioned behind it relative to the user's perspective. However, when the hand 130 is an actual hand, the display of the other objects that are positioned behind it are rendered around the hand and with depth pixilation that causes the object 150 to appear to the user as though it is positioned behind the hand.

It will be appreciated that while a hand occlusion is a typical occlusion used in a mixed reality environment, the scope of this application is not limited to any particular type or shape of occlusion. For instance, the occlusions being modified can include any virtual object, including virtual objects mapped to real world objects that have movements mapped to the corresponding movements and/or gestures of the real world objects (e.g., a virtual hand mapped to a real world hand or a virtual pen mapped to a real world stylus). The occlusions being modified can also include purely virtual objects that do not track their movements to corresponding real world objects. For instance, input received at a keyboard, a mouse, joystick, controller, touch screen, gesture device and/or other input device can also trigger movement of associated but different virtual objects/occlusions in the mixed reality environment.

Accordingly, it will be appreciated that the various objects referenced in the Figures are for illustrative purposes only, such as to indicate how a user can view multiple different objects through a mixed reality display system and that those objects can comprise real world objects and/or virtual objects that have various transparencies or other display attributes that can help the user to know relative positioning of the different objects in the mixed reality environment.

The head mounted display system 110 is able to detect movement of the user's hand or other appropriate objects (e.g., drawing device) with one or more cameras affixed to the head mounted display system 110 or one or more remote cameras. Other sensors can also be used to detect movement of the user's hand and/or drawing device. For instance, one or more magnetometers, gyroscopes, accelerometers, acoustic sensors, etc. can be mounted to the user's hand that a virtual hand 130 is mapped to. These sensors can also be incorporated into part(s) of the drawing tool 120 or other peripheral devices.

The camera(s)/sensor(s) used to detect the position and/or movement of the user's hand 130 and drawing object 120 are not illustrated at this time, inasmuch as these types of instruments are well known to those of skill in the art, as are techniques for detecting relative position and/or movement of one or more objects being observed with the cameras/sensors.

In the specific embodiment of FIG. 1, the user 100 is able to move the drawing tool 120 to manipulate a virtual box 140 by moving their real world hand or by providing other appropriate input. Movement of the drawing tool 120 and hand 130 within the mixed reality environment (when virtualized) can sometimes appear to lag behind the actual input/movement provided by the user (e.g., movement of the user's corresponding real hand/stylus). This is due, in part, to the computation expense associated with rendering the mixed reality environment and for animating movement of the hand 130 and drawing tool 120 (when virtualized) within the environment. Sensor processing and transmission delays can also add to the lag. Lag is particularly noticeable when moving the object(s) at a significant acceleration or velocity and/or when rending the object(s) with significant opaqueness and/or well-defined edges.

This disclosure provides embodiments to help reduce the user's perception of the lag, even though the total lag may remain unchanged. The disclosed embodiments can also help to reduce lag, in some instances, by reducing the processing required for rendering the object(s) during the animated movement of the object(s).

Figure 2:
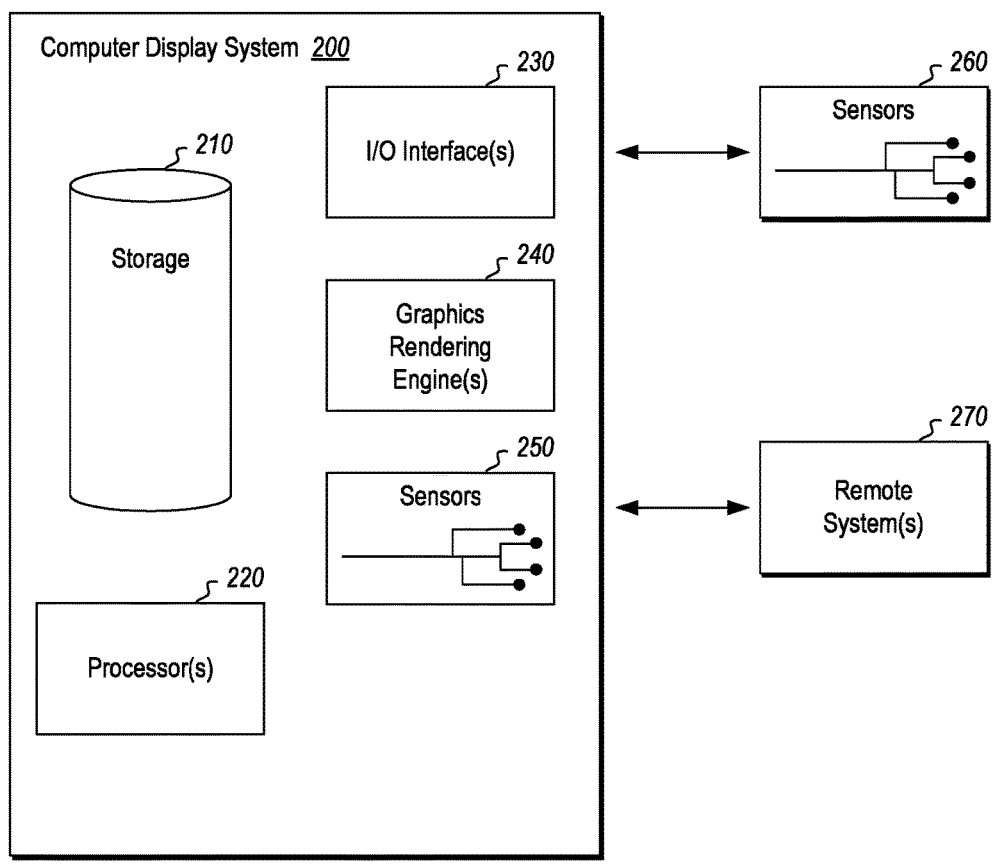
FIG. 2 illustrates a schematic view of an embodiment of a computing system configured for rendering a mixed reality environment.

FIG. 2 illustrates a schematic view of an embodiment of a computing system 200, such as a mixed reality display or headset, that is configured to implement aspects of the disclosed embodiments. As shown, the system 200 comprises various different components including storage 210, processor(s) 220, I/O interface(s) 230, graphics rendering engine(s) 240 and one or more sensors 250. The computing system 200 may also be connected through one or more wired or wireless networks to remote systems 260 (e.g., one or more remote cameras, accelerometers, gyroscopes, acoustic sensors, magnetometers, etc.) and remote system(s) 270 that are configured to perform any of the processing described with regard to computer display system 200.

In some instances, the storage 210 stores computer-executable instructions for the processors 220 and the other illustrated components to implement the disclosed methods. The storage 210 also stores graphic rendering data, such as object files and data structures that identify display attributes for the rendered objects and occlusions in the mixed reality environment, as well as the various movement thresholds that are sufficient to trigger changes in the display attributes used to render the occlusions.

The processor(s) 220 include any combination of one or more general and specialized processors, including SoC graphics processing units (e.g., GPU) and other processors that are capable of rendering graphics for the mixed reality environment and for processing the sensor data.

During use, the user is able to perceive the mixed reality environment through a display screen that is included within the I/O interface(s) 230. The I/O interface(s) 230 and sensors 250/260 also include gesture detection devices, eye trackers and/or other movement detecting components (e.g., cameras, gyroscopes, accelerometers, magnetometers, acoustic sensors, etc.) that are able to detect positioning and movement of one or more real world objects, such as a user's hand, a stylus and/or other object(s) as the user interacts within the mixed reality environment.

In some instances, the positioning and movement of the user and objects are continuously monitored to detect any variation in the position and movement of the objects, such as a detected change in position, velocity or acceleration. These movements can be absolute movements and/or relative movements, such as compared to relative positioning of the head mounted display, and such that movements/positioning of the head mounted display will be calculated into the relative movements/positioning of the objects seen in the mixed reality environment.

The graphics rendering engine 240 is configured, with the processor(s) 220, to render one or more virtual objects within the mixed reality environment, including hand occlusions or other occlusions that are mapped to the relative positions of real world objects, such that they move responsively to movement of the real world objects. The graphics rendering engine 240 is also configured to render one or more occlusions that are purely virtual (without being mapped to real world objects) but which are, nonetheless, positioned and moved responsively to user input as the user interacts within the mixed reality environment.

The graphics rendering engine(s) 240, which may include one or more GPUs, is configured to render the occlusions with certain display properties, such as coloring, transparency or opaqueness, texturing, edge definition (e.g., thickness and/or sharpness vs. blurring and/or feathering), size, and so forth. When certain movement thresholds are detected for the occlusion, then one or more combinations of the display properties for the occlusion will be modified (at least while the detected movement meets or exceeds the movement thresholds).

The movement thresholds can include any combination of the detected actual movements of the real world object associated with the occlusion, detected animation movement of the virtualized occlusion and/or detected variance or lag between the real world movement and the animated movement. The detected movements are associated with velocity and/or acceleration attributes comprising values that are detected, measured and/or calculated by the sensors and/or processors of the computing system 200.

In some embodiments, the same absolute movement thresholds are associated with all types of movements. For instance, a certain velocity or acceleration or lag associated with an occlusion will be sufficient to trigger a change in the display properties of the occlusion, regardless of the specific type of detected movement. In other embodiments, different types of movements (i.e., different movements within the six degrees of freedom, including surge, heave, sway, pitch, roll and yaw) are associated with different movement thresholds. For instance, a particular rotational acceleration will trigger a first threshold that is different than a lateral acceleration.

In some instances, there are at least two or more separate threshold limits for one or more of the different movement types. For instance, at a first acceleration metric, the first threshold is met. At a second acceleration metric, which is greater or less than the first acceleration metric, a second threshold is met. In some instances, one or more separate velocity thresholds are set for each of one or more types of movement. The appearance of the occlusion will dynamically change in response to each of the different thresholds being met, such as by changing the display attributes of the occlusion.

Some disclosed embodiments include gradually modifying the appearance of the occlusion correspondingly to different detected changes in the movement attribute(s)

associated with the occlusion. In such embodiments the display attributes/properties are continuously changed/scaled according to a continuously changing movement attribute (such that there are not discrete levels). For instance, the levels of transparency and/or edge feathering for an occlusion may be associated with many different corresponding magnitudes of velocity and/or acceleration associated with the occlusion (even when comprising movement of the real world object) and/or lag associated with rendering an animation of the occlusion.

Figure 3:
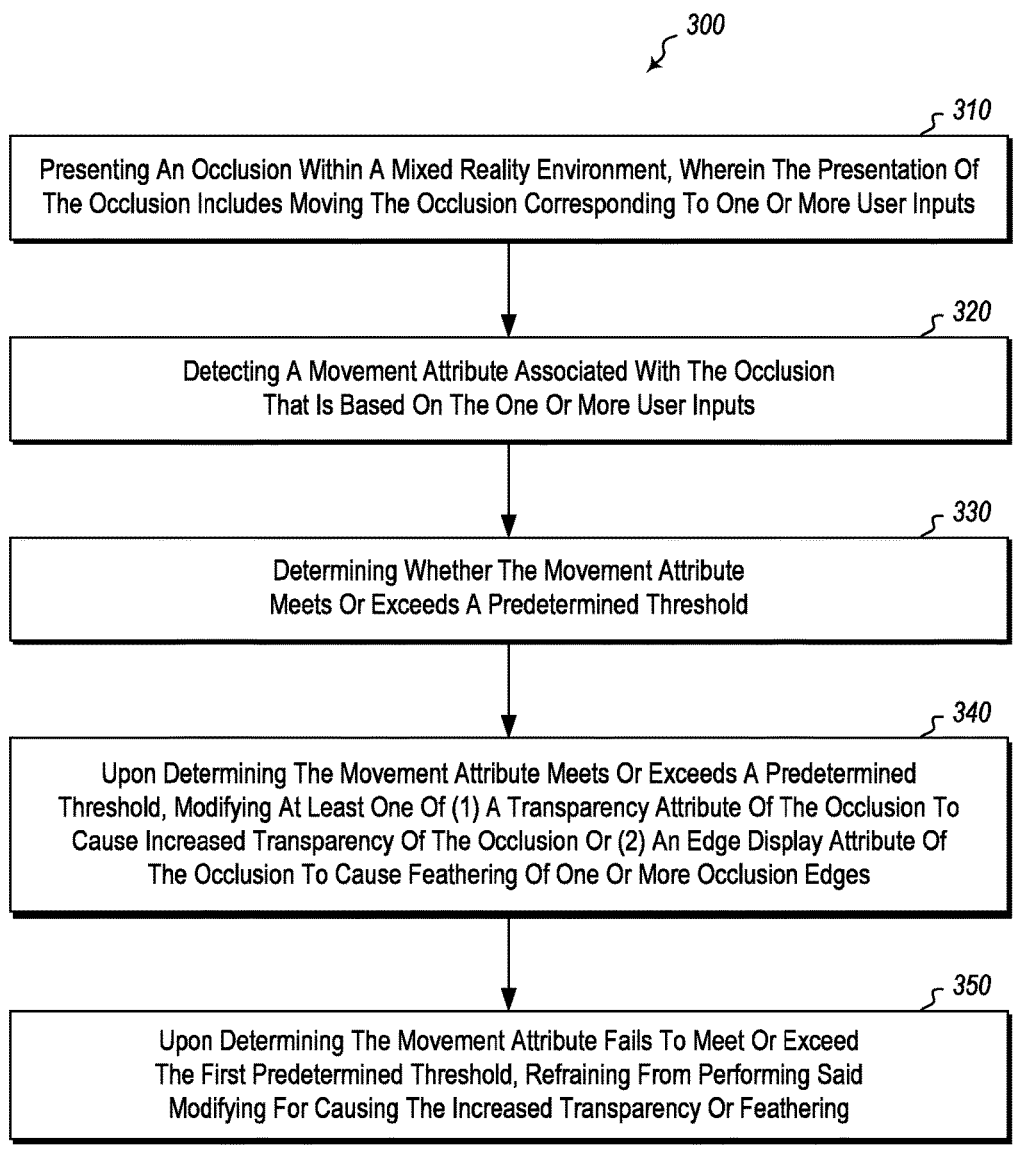
FIG. 3 illustrates a flowchart associated with disclosed methods for modifying occlusions within a mixed reality environment.

One will appreciate that embodiments disclosed herein can also be described in terms of flowcharts comprising one or more acts for accomplishing a particular result. For example, FIG. 3 illustrates a flowchart 300 of various acts associated with methods for modifying an occlusion rendered in a mixed reality environment in response to detected movement of the occlusion.

The first illustrated act (act 310) comprises a computing system presenting an occlusion within a mixed reality environment. This includes, in some instances, the generation and/or rendering of holograms within the mixed reality environment. Any combination of holograms can comprise an occlusion, if it has sufficient opaqueness to obscure at least one other object in the mixed reality environment. In some instances, act 310 includes rendering a hand occlusion corresponding to a real world hand and that is mapped (in terms of relative position and movement) to the real world hand.

Act 310 also includes moving the occlusion responsively to one or more user inputs. In some instances, this is accomplished by detecting movement of the real world hand (or another object when appropriate) and then moving the occlusion responsively. When the occlusion is a purely virtual occlusion, with no mapping to a real world object, act 310 includes detecting other user input (e.g., at an input device) and moving the occlusion responsively.

Next, the system detects a movement attribute that is based on the one or more user inputs (act 320). In some instances, this includes measuring actual movement of the user's real world hand (or other appropriately mapped object). It may also include tracking animated movement of the occlusion within the mixed reality environment and/or a detected variance between the two (e.g., identifying the lag). The movement attribute may correspond to any type of movement (within the six degrees of freedom) and will include at least one value associated with velocity, acceleration or lag between actual movement and animated movement.

Next, a determination is made as to whether the movement attribute at least meets or exceeds a predetermined threshold (act 330). This is accomplished, in some instances, by referencing one or more of the stored threshold values that are available within the storage 210 or remote systems 270. These stored movement thresholds may be specific to a particular type of movement and/or type of occlusion and/or type of mixed reality environment and/or user. The system will check for updates to the stored thresholds, in some instances, at predetermined intervals, whenever the system boots up, in response to a user request, or at other appropriate times. Alternatively, threshold updates can be pushed down to the system from a remote system.

Upon determining the movement attribute meets or exceeds a predetermined threshold, the system will modify how the occlusion is rendered, by at least one of (1) modifying a transparency attribute of the occlusion to cause increased transparency or (2) by modifying an edge display attribute of the occlusion to cause feathering or blurring of one or more of the edges. Additionally, or alternatively, the system can modify a color, texture and/or size of the occlusion in response to detecting the movement attribute reaching a particular threshold.

Different thresholds can also trigger different types of modifications. For instance, a first threshold might trigger a change in transparency and a second threshold might trigger a change in edge definition (feathering/blurring) and a third threshold might change in color and a fourth threshold might trigger a change in size.

In some instances, the system will only modify the display of the occlusion while the movement attribute meets or exceeds the movement threshold. Then, upon determining the movement attributes fails to meet or exceed the threshold, the system will refrain from performing the modification (by changing the rendering state back to the previous state) without applying the increased transparency, feathering and/or other modification(s) (act 350). This will occur for all of the different thresholds.

In some instances, as described above, there are various different levels or scales associated with different threshold limits/values, such that the system will iteratively implement one or more of the foregoing acts for moving the occlusion (act 310), detecting movement attributes associated with the occlusion (320), determine whether thresholds are met (act 330), modifying the display of the occlusion (act 340) and/or refraining from modifying the display (act 350).

Accordingly, as described above, the disclosed embodiments comprise various methods, systems, and apparatus for rendering and modifying occlusions within a mixed reality environment. By modifying the occlusions in response to certain detected movements of the occlusions, it is possible to mitigate effects associated with lag for rendering the occlusions.

Some examples of modifying the display of an occlusion will now be provided with reference to FIGS. 4-9.

Figure 4:
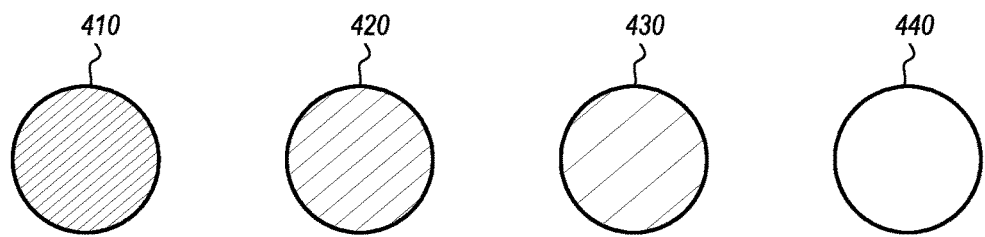
FIG. 4 illustrates different circular objects having different shading associated with different degrees of transparency for rendering occlusions within a mixed reality environment.

As shown in FIG. 4, an object comprising a circle is presented with four different degrees of shading, which corresponds to different degrees or levels of transparency/opaqueness that might be associated with the circle when the circle is rendered as an occlusion in a mixed reality environment. When the occlusion is stationary, it might have a first transparency level associated with the shading of element 410. When movement of the occlusion is detected within the mixed reality, such as when a movement attribute of the occlusion meets a first threshold associated with a particular velocity, acceleration or lag, it might have an increased transparency, as reflected by the shading of element 420. Likewise, when the movement attribute of the occlusion meets a second threshold associated with a different velocity, acceleration or lag, it might have an increased transparency, as reflected by the shading of element 430, and when the movement attribute of the occlusion meets a third threshold associated with a different velocity, acceleration or lag, it might have an increased transparency, as reflected by the shading of element 440.

It will be appreciated that while only four levels of transparency are reflected, the system may implement any number of levels or a continuous scale for modifying the transparency, as described above, based on detected velocity, acceleration or lag movement for the occlusion.

Figure 5:
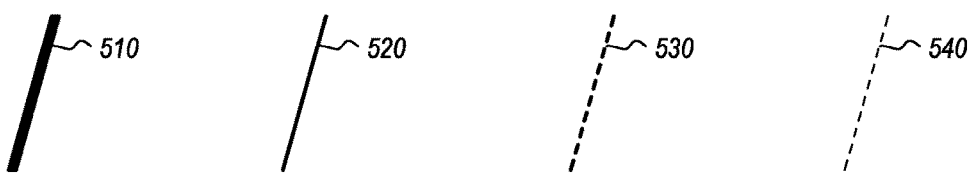
FIG. 5 illustrates different edges having different degrees of thickness representing degrees of edge definition, such as feathering or blurring, for rendering occlusions within a mixed reality environment.

As shown in FIG. 5, an object comprising a line is presented in four ways, corresponding to different degrees of edge definitions (e.g., blurring or feathering) for rendering occlusions in a mixed reality environment. In FIG. 5, the thicker line 510 has more edge definition associated with and less blurring or feathering than the other lines 520. The dashed lines 530 and 540 are illustrated to reflect an edge having greater blurring or feathering. However, in real rendering processes, the feathering and blurring of the edge will not appear as a dashed line (which is only presented for comparison sake in FIG. 5). Instead, the graphics rendering engine will soften the edges so they are not as sharp, by blurring the transition between the occlusion edge and the background elements in the mixed reality environment. This blurring/feathering can include modifying the coloring of the pixels along the edge of the occlusion.

Different degrees or levels of blurring or feathering will occur for different occlusions, based on their detected movement attributes. For instance, when the occlusion is stationary, it might have a first edge definition, with little blurring/feathering, as reflected by the edge of element 510. When movement of the occlusion is detected, such as when a movement attribute of the occlusion meets a first threshold associated with a particular velocity, acceleration or lag, it might have a decreased edge definition, or an increased edge blur/feathering, as comparatively reflected by element 520. Likewise, when the movement attribute of the occlusion meets a second threshold associated with a different velocity, acceleration or lag, it might have a further decreased edge definition, or an increased edge blur/feathering, as comparatively reflected by element 530. When the movement attribute of the occlusion meets a third threshold associated with a different velocity, acceleration or lag, it might have an even further decreased edge definition, or an increased edge blur/feathering, as comparatively reflected by element 540.

It will be appreciated that while only four levels of edge definition are comparatively shown, the system may implement any number of levels or a continuous scale for modifying the edge definition, as described above, based on detected velocity, acceleration or lag movement for the occlusion.

Figure 6:
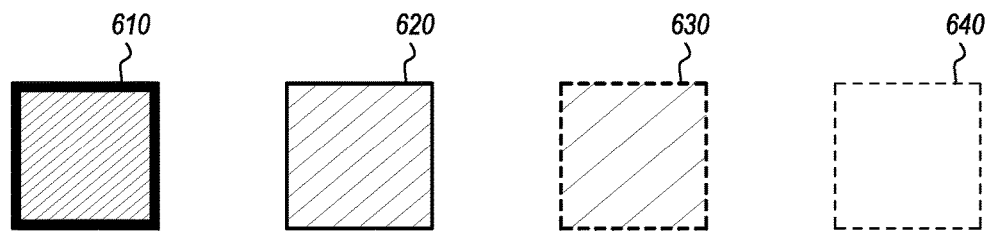
FIG. 6 illustrates different boxes having different shading and different edge thicknesses associated with different degrees of transparency and feathering, respectively, for rendering occlusions within a mixed reality environment.

FIG. 6 shows four boxes 610, 620, 630 and 640, which have different line types and shading, corresponding to different edge definition and transparency levels for an occlusion within a mixed reality environment. This illustration is provided to conceptually represent how both transparency and edge definition can change in response to different detected movement thresholds being met. For instance, box 610 is associated with relatively no movement or slower movement for an occlusion than box 620. Likewise, box 620 is associated with relatively slower movement for an occlusion than box 630, and box 630 is associated with relatively slower movement for an occlusion than box 640.

Figure 7:
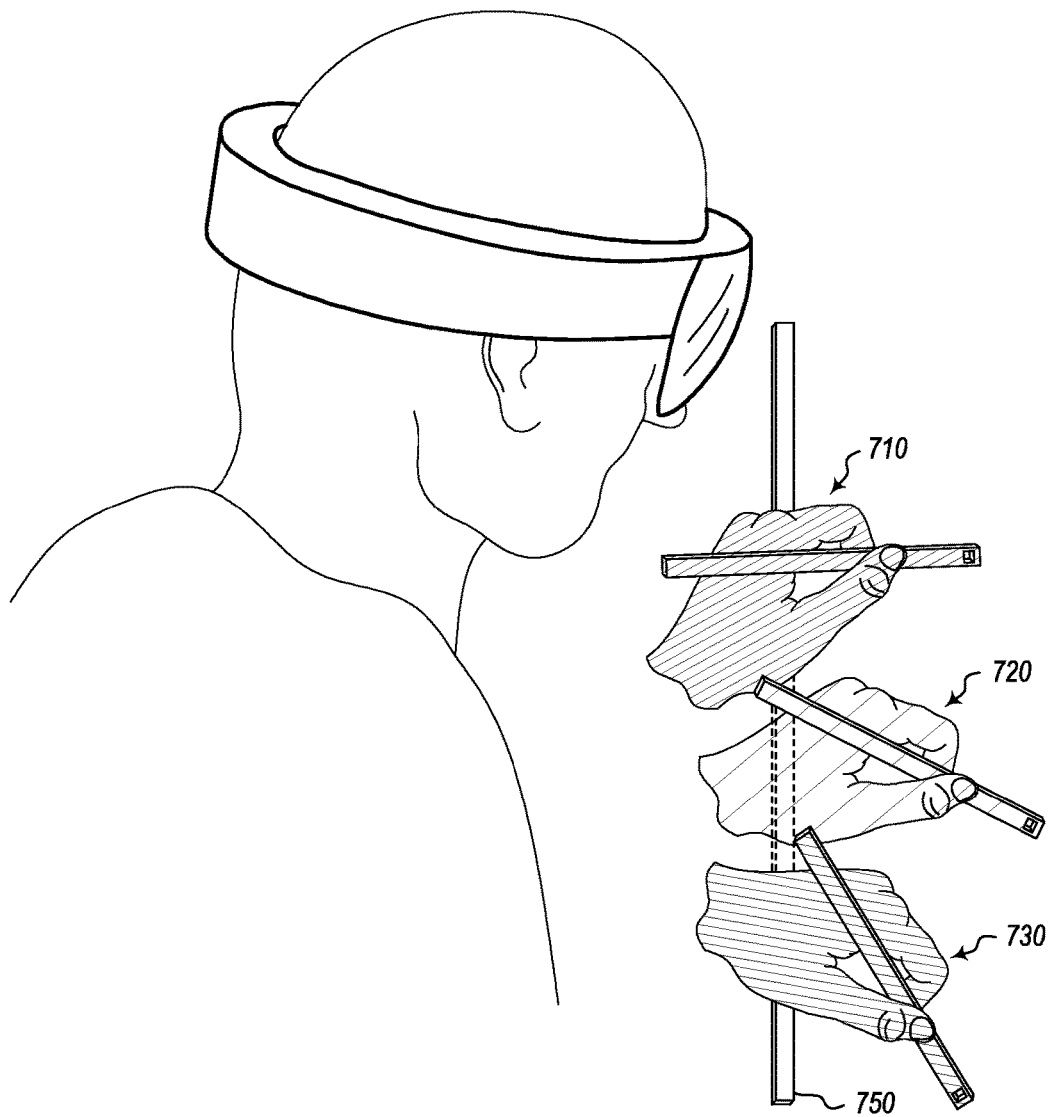
FIG. 7 illustrates a perspective view of a user wearing a head mounted display and viewing virtual objects in a mixed reality environment, including a hand occlusion moving between different positions with different transparency for the hand occlusion.
Figure 8:
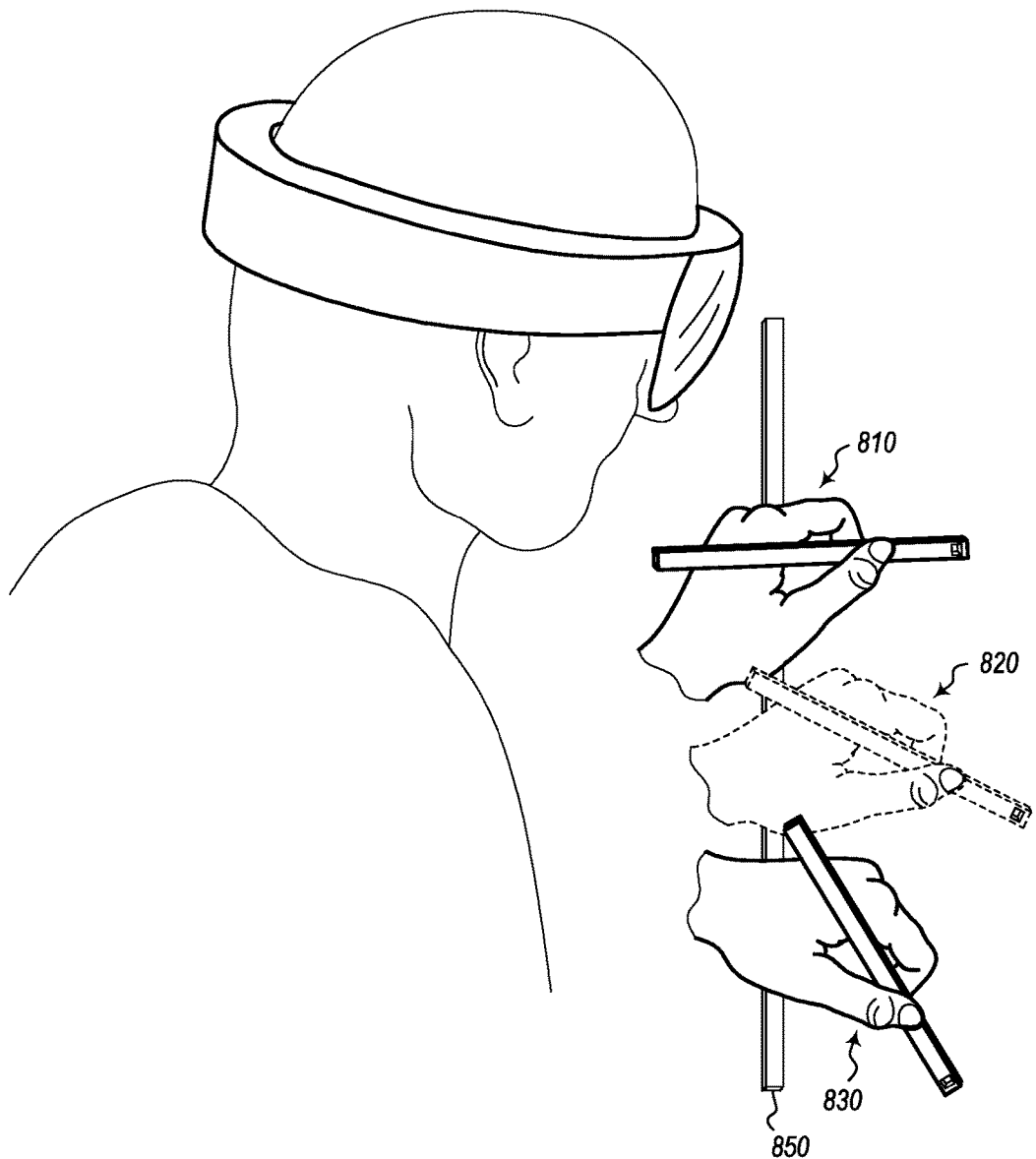
FIG. 8 illustrates a perspective view of a user wearing a head mounted display and viewing virtual objects in a mixed reality environment, including a hand occlusion moving between different positions with different edge definition (blurring/feathering) for the hand occlusion.
Figure 9:
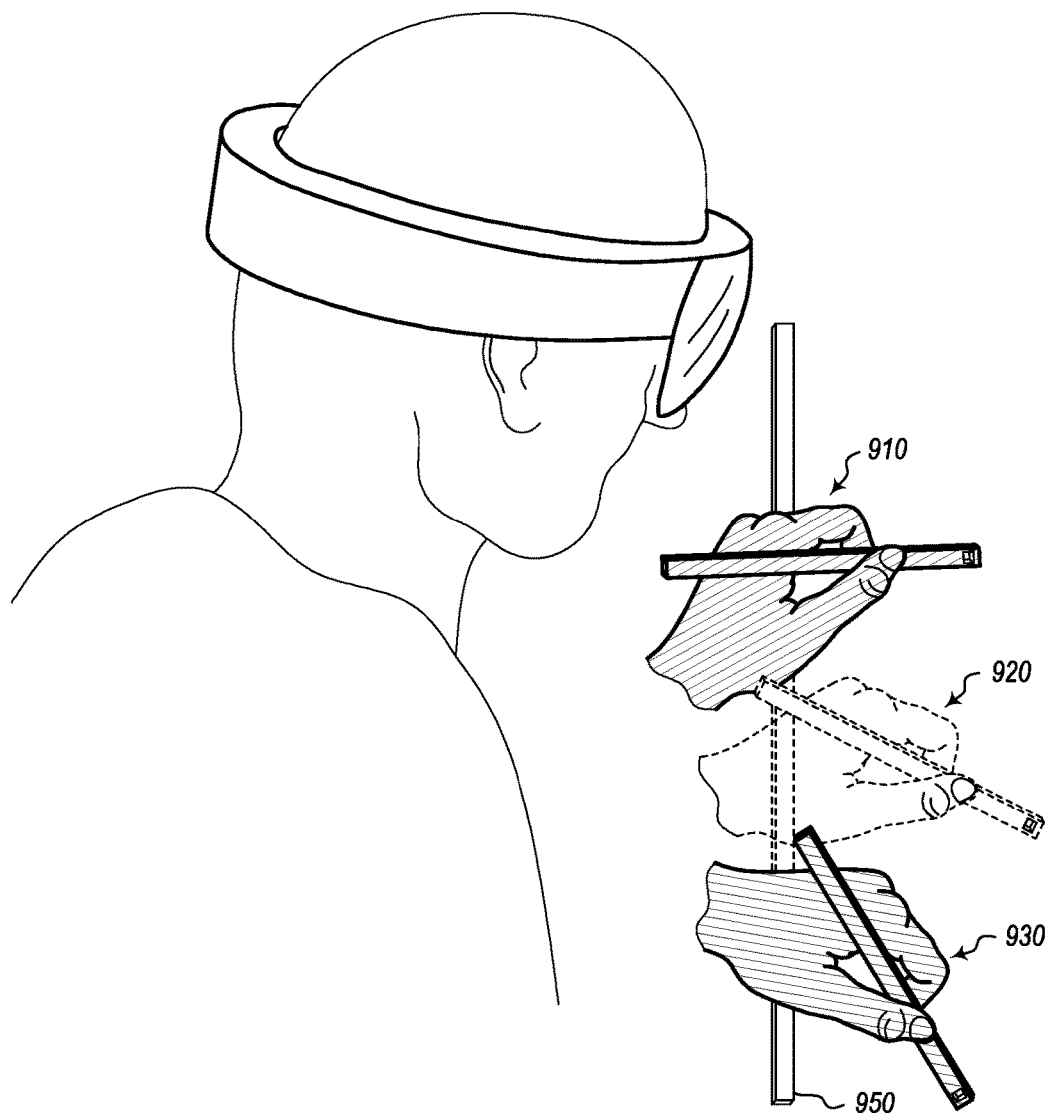
FIG. 9 illustrates a perspective view of a user wearing a head mounted display and viewing virtual objects in a mixed reality environment, including a hand occlusion moving between different positions with different transparency and edge definition for the hand occlusion.

FIGS. 7, 8 and 9 show a hand occlusion rendered to a user in a mixed reality environment in which the hand occlusion is moved and the display properties of the hand occlusion are dynamically modified in direct response to the movement attributes of the hand occlusion meeting predetermined thresholds.

In FIG. 7, for instance, the hand occlusion moves from position 710, through position 720, to position 730. Object 750 is presented behind the hand occlusion to help reflect the relative change in the rendering of the hand occlusion as the hand occlusion passes through position 720. At position 720, the movement attribute of the hand occlusion is determined to meet or exceed a predetermined threshold required to modify the display attributes of the hand occlusion. Accordingly, at position 720, the display of the hand occlusion is modified by increasing the relative transparency of the hand occlusion, relative to a transparency at positions 710 and 730, when the hand occlusion was not moving or moving as fast. The degree of transparency at 720 may be based on detected velocity, acceleration and/or lag associated with the occlusion. The transparency of the hand occlusion may jump between the different transparency levels abruptly or, alternatively, gradually increase and decrease between the transparency levels shown, such that there may be many different transparency rendering setting in between the different threshold levels, corresponding to different detected movement values.

When the detected movement which triggered the modification ends, or is reduced to a lower threshold metric, such as at position 730, the visual appearance of the occlusion is changed back to a previous state within the mixed reality environment. Likewise, if at any point the movement attribute increased to trigger a higher threshold than the threshold associated with position 720, then the transparency would be further increased beyond that reflected at position 720.

FIG. 8 illustrates a related embodiment, wherein a hand occlusion passes from position 810, through position 820, to position 830, in front of object 850. Here, the hand occlusion is rendered with an increased feathering/blurring (or decreased edge definition) at position 820, in response to detecting a movement attribute at position 820 that meets a threshold associated with the increased feathering/blurring.

When the detected movement which triggered the modification ends, or is reduced to a lower threshold metric, such as at position 830, the visual appearance of the occlusion is changed back to a previous state within the mixed reality environment. Likewise, if at any point the movement attribute increased to trigger a higher threshold than the threshold associated with position 820, then the feathering/blurring would be further increased beyond that reflected at position 820.

The degree of edge definition at 820 may be based on detected velocity, acceleration and/or lag associated with the occlusion. Also, the edge definition of the occlusion may jump directly between the different levels with abrupt jumps or, alternatively, gradually increase and decrease between the levels, such that there may be many different rendering setting in between the different threshold levels, corresponding to the different detected movement values.

Finally, FIG. 9 illustrates a related embodiment, wherein a hand occlusion passes from position 910, through position 920, to position 930, in front of object 950. Here, the hand occlusion is rendered with an increased feathering/blurring (or decreased edge definition), as well as increased transparency, at position 920, in response to detecting a movement attribute at position 920 that meets a threshold associated with the increased feathering/blurring and transparency.

The transparency and edge definition used for the occlusion at position 920 may be based on detected velocity, acceleration and/or lag associated with the occlusion. Also, the transparency and edge definition of the occlusion may jump directly between the different levels with abrupt jumps or, alternatively, gradually increase and decrease between the levels, such that there may be many different rendering setting in between the different threshold levels, corresponding to the different detected movement values.

When the detected movement which triggered the modification ends, or is reduced to a lower threshold metric, such as at position 930, the visual appearance of the occlusion is changed back to a previous state within the mixed reality environment. Likewise, if at any point the movement attribute increased to trigger a higher threshold than the threshold associated with position 920, then the transparency and blurring/feathering would be further increased beyond that reflected at position 920.

While the foregoing embodiments are specifically related to changing the transparency and edge definition of the occlusion, based on detected movement associated with the occlusion, it will be appreciated that other changes (e.g., changing coloring, size, texturing, etc.) can be used for modifying the display of the occlusion, in addition to or in the alternative to those described above, based on detecting movement attributes of the occlusion that meet predetermined thresholds.

It will also be appreciated that the occlusions that are modified can include any occlusions, whether they are mapped to track their movements to real world items, or whether they are pure virtualized holograms that do not track their movements to real world items. The occlusions can also include elements that are similar to body parts (e.g., hand occlusion) or objects held by a user (e.g., the illustrated peripheral/drawing instrument 120 of FIG. 1), or other objects/holograms (e.g., virtual box 140 of FIG. 1).

By modifying the display attributes of occlusions in the mixed reality environment, it is possible to improve the user experience. For example, disclosed embodiments can mitigate detrimental effects associated with lag in the rendering of hand occlusions by blurring the edges of the occlusions and/or by increasing the transparency of the occlusions so that the lag is less apparent to the user. In some instances, the lag can also be reduced by reducing rendering requirements, such as by reducing rendering requirements near the edges of the occlusion or, in some instances, by reducing texturing requirements for the occlusions.

The disclosed methods may be practiced by a computer system, such as described in FIG. 2, including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system for dynamically modifying an occlusion within a mixed reality environment, the computing system comprising:
   one or more processors; and
   one or more storage device having stored computer-executable instructions which are executable by the one or more processors for implementing a method that includes:
   rendering the mixed reality environment;
   presenting an occlusion within the mixed reality environment, wherein the presentation of the occlusion includes moving the occlusion corresponding to one or more user inputs;
   detecting a movement attribute associated with the occlusion that is based on the one or more user inputs, the movement attribute comprising at least one of a velocity or acceleration;
   determining whether the movement attribute meets or exceeds a predetermined threshold;
   upon determining the movement attribute meets or exceeds a first predetermined threshold, modifying at least one of a transparency attribute of the occlusion to cause increased transparency of the occlusion, an edge display attribute of the occlusion to cause feathering of one or more occlusion edges or coloring of the occlusion; and
   upon determining the movement attribute fails to meet or exceed the first predetermined threshold, refraining from performing said modifying for causing the increased transparency or feathering.

2. The computing system of claim 1, wherein the method further includes:
   responsively returning the transparency attribute, the edge display attribute or coloring to a previous state that existed prior to the modifying subsequent to the modifying and responsive to detecting a change in speed of movement that comprises a reduction in the movement attribute.

3. The computing system of claim 1, wherein the method further includes:
   further modifying at least one of the transparency attribute to increase transparency of the occlusion or the edge display attribute to increase feathering of the one or more occlusion edges subsequent to the modifying and responsive to detecting a change in speed of movement comprising an increase in the movement attribute, wherein the change in speed of movement causes the movement attribute to meet or exceed a second predetermined threshold.

4. The computing system of claim 1, wherein the movement attribute comprises acceleration.

5. The computing system of claim 1, wherein the movement attribute comprises average velocity.

6. The computing system of claim 1, wherein the one or more user input comprises movement of a user body part and wherein the occlusion comprises a graphical rendering corresponding to the user body part.

7. The computing system of claim 1, wherein the occlusion is positioned between a viewer's point of view and a target object displayed within the mixed reality environment and wherein the modifying includes modifying the transparency attribute of the occlusion so as to cause the occlusion to be rendered with a transparency level that is sufficient for the viewer to view the target object through the occlusion within the mixed reality environment.

8. The computing system of claim 1, wherein the computing system is configured as a head mounted device.

9. A method for dynamically modifying an occlusion within a mixed reality environment, the method comprising:
   rendering the mixed reality environment;
   presenting an occlusion within the mixed reality environment, wherein the presentation of the occlusion includes moving the occlusion corresponding to one or more user inputs;
   detecting a movement attribute associated with the occlusion that is based on the one or more user inputs, the movement attribute comprising at least one of a velocity or acceleration;
   determining whether the movement attribute meets a predetermined threshold;
   upon determining the movement attribute meets a first predetermined threshold, modifying at least one of a transparency attribute of the occlusion to cause increased transparency of the occlusion or an edge display attribute of the occlusion to cause feathering of one or more occlusion edges; and
   upon determining the movement attribute fails to meet the first predetermined threshold, refraining from performing said modifying for causing the increased transparency or feathering.

10. The method of claim 9, wherein the method further includes rendering the mixed reality environment.

11. The method of claim 9, wherein the method further includes:
    detecting a change in speed of movement that includes a reduction in the movement attribute subsequent to the modifying; and
    responsively returning the transparency attribute or the edge display attribute to a previous state that existed prior to the modifying.

12. The method of claim 9, wherein the method further includes:
    detecting a change in speed of movement subsequent to the modifying, the change in speed comprising an increase in the movement attribute such that the movement attribute meets a second predetermined threshold, and
    further modifying at least one of the transparency attribute to increase transparency of the occlusion or the edge display attribute to increase feathering of the one or more occlusion edges responsive to the detected change in speed.

13. The method of claim 9, wherein the movement attribute comprises acceleration.

14. The method of claim 9, wherein the movement attribute comprises average velocity.

15. The method of claim 9, wherein the one or more user input comprises movement of a user body part and wherein the occlusion comprises a graphical rendering corresponding to the user body part.

16. The method of claim 9, wherein the occlusion is positioned between a viewer's point of view and a target object displayed within the mixed reality environment and wherein the modifying includes modifying the transparency attribute of the occlusion so as to cause the occlusion to be rendered with a transparency level that is sufficient for the viewer to view the target object through the occlusion within the mixed reality environment.

17. The method of claim 9, wherein the method is implemented by a head mounted device.

18. A head mounted device which is configured for rendering a mixed reality environment to a user wearing the head mounted device and for dynamically modifying hand occlusion within a mixed reality environment, the head mounted device comprising:
- one or more processors configured for executing stored computer-executable instructions, the one or more processors including a graphics rendering engine for rendering the mixed reality environment and one or more occlusions within the mixed reality environment; and
- one or more storage media having the stored computer-executable instructions that are executable by the one or more processors for implementing a method that includes:
  - rendering the mixed reality environment;
  - presenting a hand occlusion within the mixed reality environment, wherein the presentation of the hand occlusion includes moving the hand occlusion corresponding to one or more user inputs;
  - detecting a movement attribute associated with movement of the hand occlusion, the movement attribute comprising at least one of a velocity or acceleration;
  - determining whether the movement attribute meets or exceeds a predetermined threshold;
  - upon determining the movement attribute meets or exceeds the predetermined threshold, modifying at least one of a transparency attribute of the hand occlusion to cause increased transparency of the hand occlusion or an edge display attribute of the hand occlusion to cause feathering of one or more hand occlusion edges; and
  - upon determining the movement attribute fails to meet or exceed the predetermined threshold, refraining from performing said modifying for causing the increased transparency or feathering.

19. The head mounted device of claim 18, wherein the method further includes:
- detecting a change in speed of movement that includes a reduction in the movement attribute subsequent to the modifying; and
- responsively returning the transparency attribute or the edge display attribute to a previous state that existed prior to the modifying.

20. The head mounted device of claim 18, wherein the method further includes:
- detecting a change in speed of movement subsequent to the modifying, the change in speed comprising an increase in the movement attribute, and
- further modifying at least one of the transparency attribute to increase transparency of the hand occlusion or the edge display attribute to increase feathering of the one or more occlusion edges responsive to the detected change in speed.

* * * * *